US012756344B2

(12) United States Patent

Desmet et al.

(10) Patent No.: US 12,756,344 B2
(45) Date of Patent: Oct. 6, 2026

(54) EXTERNALLY EXCITED ELECTRIC MACHINE AND STATOR WINDING RECONFIGURATION METHOD

(71) Applicant: Dana Automotive Systems Group, LLC, Maumee, OH (US)

(72) Inventors: Frederik Desmet, Maldegem (BE); Joachim Druant, Houthulst (BE)

(73) Assignee: DANA AUTOMOTIVE SYSTEMS GROUP, LLC, Maumee, OH (US)

( * ) Notice: Subject to any disclaimer, the term of this patent is extended or adjusted under 35 U.S.C. 154(b) by 249 days.

(21) Appl. No.: 18/623,508

(22) Filed: Apr. 1, 2024

(65) Prior Publication Data

US 2025/0309808 A1 Oct. 2, 2025

(51) Int. Cl.
*H02P 25/18* (2006.01)

(52) U.S. Cl.
CPC .................................. *H02P 25/184* (2013.01)

(58) Field of Classification Search
CPC ............................... H02P 25/184; H02P 25/18
USPC ......................................... 318/705, 706, 700
See application file for complete search history.

(56) References Cited

U.S. PATENT DOCUMENTS

| | | | | |
|---|---|---|---|---|
| 5,227,710 A * | 7/1993 | Lewus | H02P 1/44 318/785 |
| 6,680,997 B2 * | 1/2004 | Das | H02P 6/08 318/400.41 |
| 7,612,520 B2 * | 11/2009 | Cyran | H02P 7/281 318/727 |
| 9,163,600 B2 * | 10/2015 | Neet | B60W 10/08 |
| 9,882,521 B2 | 1/2018 | Namuduri et al. | |
| 10,622,859 B2 | 4/2020 | Neuburger et al. | |
| 2018/0119670 A1 | 5/2018 | Eden | |

OTHER PUBLICATIONS

Tang, L. et al., "A reconfigurable-winding system for electric vehicle drive applications," Proceedings of the 2017 IEEE Transportation Electrification Conference and Expo (ITEC), Jun. 22, 2017, Chicago, Illinois, 6 pages.

* cited by examiner

*Primary Examiner* — David Luo
(74) *Attorney, Agent, or Firm* — McCoy Russell LLP

(57) ABSTRACT

Systems and methods for an externally excited electric machine. The method for operation of the externally excited electric machine, in one example, includes operating the externally excited electric machine above a threshold speed in a first stator winding configuration of a stator and switching the stator from the first winding configuration to a second winding configuration while the externally excited electric machine is maintained above the threshold speed. In the system, the externally excited electric machine includes multiple rotor windings which are configured to be externally excited.

17 Claims, 5 Drawing Sheets

EXTERNALLY EXCITED ELECTRIC MACHINE AND STATOR WINDING RECONFIGURATION METHOD

TECHNICAL FIELD

The present disclosure relates to an externally excited electric machine with stator configuration switching capabilities.

BACKGROUND AND SUMMARY

Some permanent magnet electric motor and inverter assemblies have been designed with stator winding reconfiguration technology that is capable of varying the stator's winding configuration during motor operation. For example, U.S. Pat. No. 9,882,521 B2 to Namuduri et al. discloses an electric drive system which includes a switch circuit for switching a permanent magnet motor between a full winding control mode and a half winding control mode. The switch assembly includes multiple alternating current (AC) switching devices.

The inventors have recognized several issues with Namuduri's electric drive system and other previous electric motor systems. For instance, in Namuduri's motor and other permanent magnet motors with winding reconfiguration functionality, the window available for stator winding switching is constrained to base speeds of the motor due to the relatively large amount of back electromotive force (EMF) that is generated when the motor is operated above the base speed. This back EMF is unable to be compensated for by field weakening while all the switches are open.

The inventors have recognized the aforementioned issues and developed a method for operation of an externally excited electric machine system to at least partially address the issues. The method includes, in one example, operating the externally excited electric machine above a threshold speed in a first stator winding configuration of a stator. The method further includes switching the stator from the first winding configuration to a second winding configuration while the externally excited electric machine is maintained above the threshold speed. In such an example, the externally excited electric machine includes rotor windings that are configured for external excitation. In this way, the stator winding configuration switching is able to occur over a broader window of machine operation. Consequently, the electric machine's performance and efficiency is increased and the drawbacks with permanent magnets are avoided, such as potential environmental drawbacks associated with sourcing the magnets.

In one example, switching the stator from the first winding configuration to the second winding configuration may include reducing a field current which is delivered to the rotor windings to an upper threshold value for the switching event. Maintaining the field current above the upper threshold value allows back EMF to be reduced, thereby avoiding unwanted regeneration in a subsequent stator current reduction step to be avoided, if desired. Consequently, machine performance and efficiency is increased. Continuing with such an example, switching the stator from the first winding configuration to the second winding configuration may include initiating a reduction in stator current in response to the field current reaching the upper threshold. The stator current may specifically be brought down to zero or a value approaching zero and while the stator current is held at zero, switches in a stator winding reconfiguration device may be actuated to alter the stator's winding configuration. In this way, the stator's configuration is able to be quickly altered across in wider range of machine operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An electric machine system which is capable of switching a winding configuration of a stator while the electric machine is operated above a base speed threshold. To achieve this capability, the electric machine system utilizes an externally excited synchronous machine in tandem with a dynamic winding reconfiguration device that is designed to switch the configuration of the stator when the machine is operated above the base threshold speed. To elaborate, in one example, a field current may first be decreased to an upper threshold value for the switching event. Once, the field current reaches the upper threshold value, the stator current is reduced to zero. In turn, the stator current is held at zero while the dynamic winding reconfiguration device alters the stator's configuration and once the stator is reconfigured, the field current and the stator current are brought up to new set points. In this way, the operating window for stator winding reconfiguration is enlarged by reducing the magnetic flux in the rotor due to the use of an externally excited rotor. To elaborate, back electromotive force (EMF) is able to be reduced, in particular when the machine operates above a base speed due to the use of the externally excited rotor. In permanent magnet (PM) motors, unwanted regeneration results when the line-to-line back EMF is higher than the de-link voltage. To elaborate, in PM motors, the inverter acts as diode rectifier. Overall, the electric machine system achieves increased performance and efficiency across a wider range of machine operation while decreasing the machine's cost and environmental impact when compared to PM electric motors.

Figure 1:
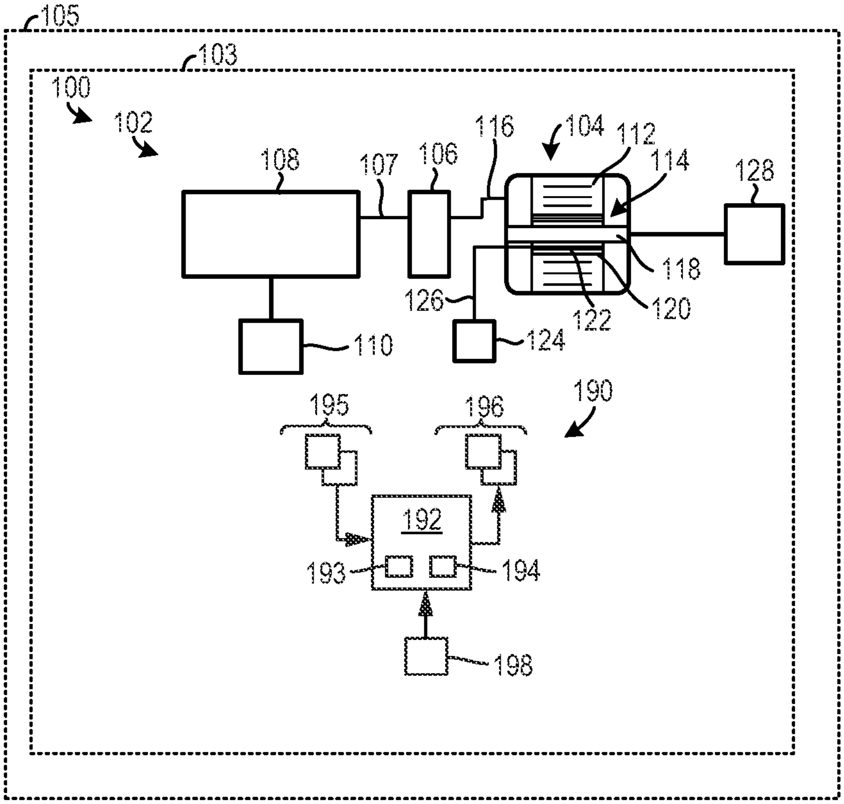
FIG. 1 is a diagram of an exemplary electric drive with an externally excited electric machine, a dynamic winding reconfiguration device, and an inverter.

FIG. 1 shows an example of an electric drive 100 with an externally excited electric machine system 102. The electric drive 100 may be included in an electric powertrain 103 of a vehicle 105, in one example. In such an example, the electric machine included in the system may be a traction motor. However, it will be understood that the electric drive

100 may be used in a variety of fields including, but not limited to, industrial machines, agricultural systems, mining systems, and the like.

The externally excited electric machine system 102 includes an externally excited electric machine 104 (e.g., an externally excited synchronous motor (EESM)) that is electrically coupled to a dynamic winding reconfiguration device 106 via electrical connections 107 (e.g., wires, bus bars, combinations thereof, and the like). The dynamic winding reconfiguration device 106 is configured to change the winding configuration of a stator 112 in the externally excited electric machine 104. To elaborate, the dynamic winding reconfiguration device 106 is configured to shift the stator between a first winding configuration and a second winding configuration. The first electric configuration may be a star configuration and the second configuration may be a delta configuration or vice versa. In other examples, the first electric configuration may be a series configuration and the second electric configuration may be a parallel configuration or vice versa. In other examples the electric machine may have five, six, or nine phases in which switching between the first winding configuration and the second winding configuration does not demand a change in all the phase configurations during a winding configuration shift event. It will be understood that the stator reconfiguration event may be referred to as a stator shift. An exemplary architecture of a dynamic winding reconfiguration device and associated system is elaborated upon herein with regard to FIG. 2.

In the electric drive 100, an inverter 108 is electrically coupled to the externally excited electric machine 104 by way of the dynamic winding reconfiguration device 106. The inverter 108 may be electrically connected to an energy storage device 110 (e.g., one or more traction batteries, capacitor(s), fuel cell(s), combinations thereof, and the like). As such, electrical energy may flow between the inverter and the energy storage device during drive operation and regeneration operation, when the externally excited electric machine 104 is designed as a motor-generator.

The externally excited electric machine 104 includes a stator 112 and a rotor 114. The stator 112 is electrically coupled to the dynamic winding reconfiguration device 106 via electrical connections 116 (e.g., wires, bus bars, combinations thereof, and the like). The rotor 114 includes a rotor shaft 118 and a rotor core 120 which include externally excited rotor windings 122 which may include copper or aluminum coils. The rotor windings 122 are electrically coupled to an energy source 124 via electrical connections 126. The energy source 124 may include an inverter or DC/DC converter for exciting the rotor windings which may be electrically coupled to the energy storage device 110 and/or another suitable energy storage device. Further, due to the use of an externally excited rotor windings 122, permanent magnets may not be included the rotor.

The electric drive 100 may be coupled to downstream components 128. In the EV example, the downstream components 128 may include one or more drive axle assemblies, drive wheels, and the like.

The electric drive 100 may further include a control system 190 with a controller 192 as shown in FIG. 1. The controller 192 may include a microcomputer with components such as a processor 193 (e.g., a microprocessor unit), input/output ports, an electronic storage medium 194 for executable programs and calibration values (e.g., a read-only memory chip, random access memory, keep alive memory, a data bus, and the like). The storage medium may be programmed with computer readable data that represents instructions that are executable by a processor for performing the methods and control techniques described herein as well as other variants that are anticipated but not specifically listed. As such, control techniques, methods, and the like expanded upon herein may be stored as instructions in non-transitory memory.

The controller 192 may receive various signals from sensors 195 coupled to various regions of the electric drive 100. For example, the sensors 195 may include a rotor current sensor, an electric machine speed sensor, a stator current sensor, an electric machine temperature sensor, an auxiliary contact sensor, a battery state of charge sensor, an inverter current sensor, and the like. Electric machine speed may be ascertained from the amount of power sent from the inverter 108 to the electric machine 104. An input device 198 (e.g., accelerator pedal, brake pedal, drive mode selector, gear selector, combinations thereof, and the like, in the EV example) may further provide input signals indicative of an operator's intent for electric drive control.

Although, one controller is depicted in FIG. 1, it will be understood that the electric drive and the system in which it is incorporated, such as a vehicle, may include multiple controllers. For instance, in the EV example, a vehicle control unit (VCU) may be included in the control system 190. Additionally, a motor control unit (MCU) may be included in the control system. In such an example, the VCU and the MCU may be distinct controllers with independent hardware and may be formed in separate enclosures which are spaced away from one another. However, in other examples, the VCU and the MCU may be collocated. In either case, the VCU and the MCU are in electronic communication with one another.

Upon receiving the signals from the various sensors 195 of FIG. 1, the controller 192 processes the received signals, and employs various actuators 196 of the electric drive components to adjust the components based on the received signals and instructions stored on the memory of controller 192. For example, the controller 192 may receive a signal indicative of an operator's request for increased electric machine output. In response, the controller 192 may command operation of the inverter 108 to adjust the electric machine's mechanical power output and increase the power delivered from the externally excited electric machine 104 to the downstream components 128. The other controllable components in the electric drive may function in a similar manner in relation to sensor inputs and command outputs.

Figure 2:
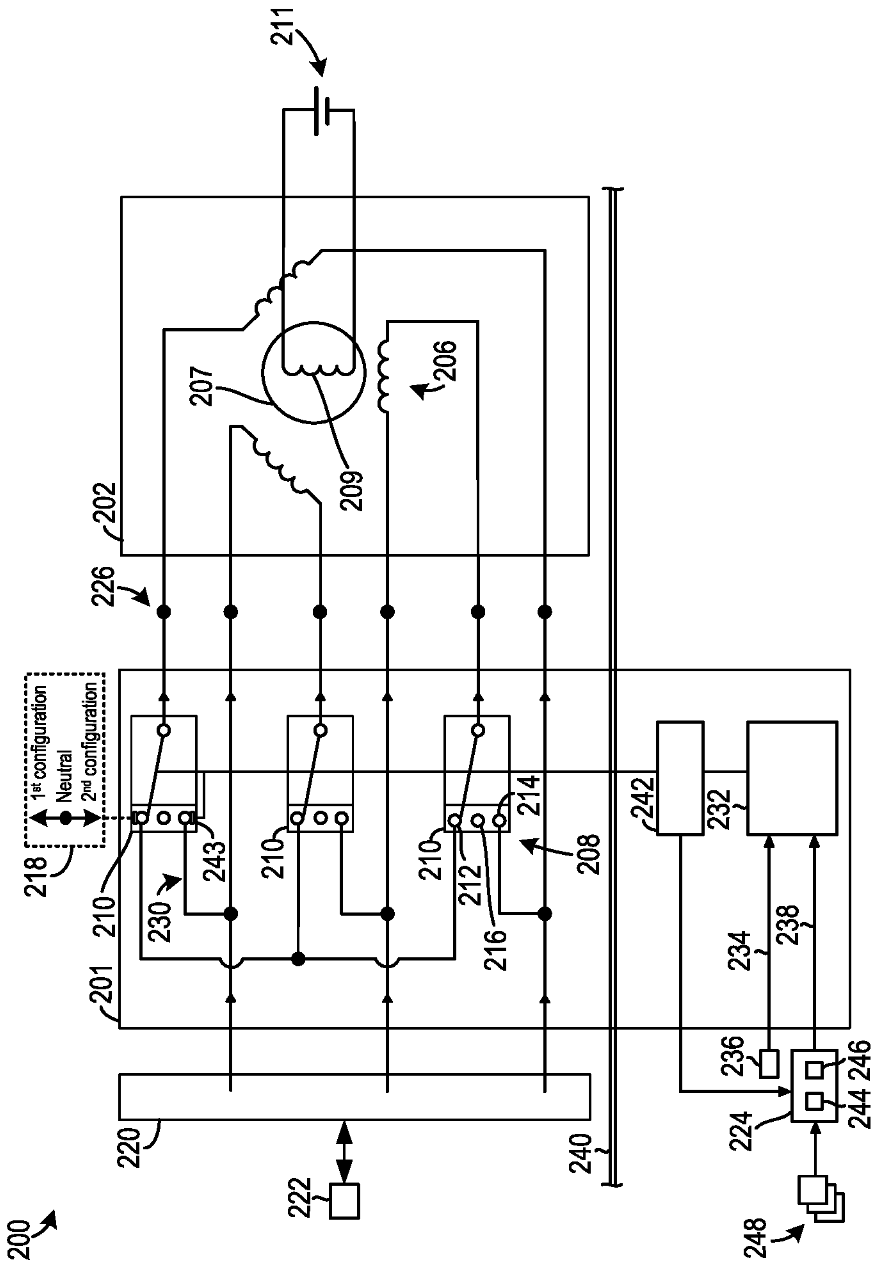
FIG. 2 is an exemplary circuit diagram of a winding reconfiguration assembly.

FIG. 2 shows an example of a circuit diagram architecture of a winding reconfiguration assembly 200 with a winding reconfiguration device 201 for an externally excited electric machine system with winding reconfiguration functionality. It will be understood, that the winding reconfiguration assembly 200 depicted in FIG. 2 may be included in the externally excited electric machine system 102, depicted in FIG. 1.

FIG. 2 specifically shows an electric circuit diagram for the winding reconfiguration assembly 200. In the diagram circles represent electrical junctions. The winding reconfiguration assembly 200 is used to switch the stator winding configuration of an externally excited electric machine 202. The winding reconfiguration assembly 200 and the externally excited electric machine system 202 may be included in an electric drive, as indicated above.

In one example, the winding reconfiguration device 201 may be incorporated into or otherwise mounted to a housing of the externally excited electric machine 202. As such, the winding reconfiguration device 201 and the externally excited electric machine 202 may be positioned in a common enclosure to facilitate efficient incorporation into an electric drive. However, other electric machine and winding reconfiguration device configurations are possible.

The winding reconfiguration assembly 200 is designed to switch stator windings 206 in the electric machine between a first electric configuration and a second electric configuration. In one example, the first electric configuration may be a star configuration and the second configuration may be a delta configuration or vice versa. In other examples, the first electric configuration may be a series configuration and the second electric configuration may be a parallel configuration or vice versa. In other examples the externally excited electric machine 202 may have five, six, or nine phases in which the first electric configuration and the second configuration of the stator windings 206 do not demand that all the phases be reconfigured during the shift event. This winding configuration adaptability increases electric machine efficiency through a wider machine speed range in comparison to motors with a static winding configuration. The winding reconfiguration functionality further enables an increase in the machine's speed/torque range as well as machine efficiency over the expanded range.

The externally excited electric machine 202 is illustrated as a machine with three-phase stator windings 206. However, electric machines with five, six, and nine phase stator windings, have been contemplated. Further, the stator windings 206 of the electric machine electromagnetically interact with a rotor 207. The rotor 207 (and specifically rotor windings 209) is externally excited via an energy source 211 such as inverter which is electrically connected to an energy storage device and/or other suitable rotor excitation source. In turn, the rotor 207 may be coupled to downstream components as previously indicated.

The winding reconfiguration device 201 includes a multi-position switching assembly 208 that switches the winding configuration. As illustrated, the multi-position switching assembly 208 includes three multi-position switches 210 (e.g., multi-position contactors) incorporated therein, allowing dynamic reconfiguration of all the phases of the stator winding simultaneously. However, the contactor device may include an alternate number of contactors. For instance, in a six-phase electric machine the contactor device may include six contactors. The number of contactors may therefore correlate to the number of phases in the electric machine. The multi-position contactor device is designed to dynamically reconfigure the stator winding configuration faster than previous switching devices, thereby enhancing electric machine performance.

Using an externally exited electric machine in conjunction with the winding reconfiguration device that is capable of shifting the stator between different electrical configuration may allow faster or lower-cost winding reconfiguration switches to be utilized in the winding reconfiguration device, if desired. The multi-position switches 210 may be mechanical switches actuated by one or more actuators or wide-bandgap semiconductor switches.

Each of the switches 210 in the multi-position switching assembly 208, in the illustrated example, has a first position 212 corresponding to the first electric configuration (e.g., the star configuration or the series configuration) and a second position 214 corresponding to the second electric configuration (e.g., the delta configuration or the parallel configuration) as well as a neutral configuration 216. To elaborate, in one example, the contactors may be designed to switch between a star configuration and a delta configuration. In another example, the contactors may be designed to switch between a parallel configuration and a series configuration, referred to as an H-bridge set.

The switches' adjustability between these positions is indicated at 218. In the neutral position, the switches prevent electric power transfer from the winding reconfiguration device 201 to the stator windings 206. In this way, electric power to the electric machine may be discontinued via the winding reconfiguration assembly, to avoid conditions that may lead to machine degradation. Consequently, electric machine longevity is increased. However, in other examples, the contactors neutral position may be forgone. As such, the multi-position switches may be two or three position switches. The switches may be placed in the neutral configuration to avoid undesirable motor braking.

An inlet phase electrical interface 220, such as multiple bus bars, provides an electrical connection between the winding reconfiguration device 201 and an inverter 222. A controller 224 (e.g., a machine control unit (MCU)) may augment the electrical power delivered from the inverter 222 to the inlet phase electrical interface 220.

A return phase electric interface 226, such as multiple bus bars, serves as a return phase connection between the stator windings 206 and the winding reconfiguration device 201. The return phase bus bars may be used in conjunction with the multi-position switches 210 to alter the stator winding configuration. Further, as illustrated, return phase short bus bars 230 are electrically coupled to the second position of the multi-position switches 210. In this way, the contactors allow electric energy to flow back to the inlet phase bus bars in their second position to facilitate efficient switching of the winding reconfiguration device 201.

The winding reconfiguration device 201 further includes an electromagnetic actuator 232 configured to switch the multi-position switches between the first position, the second position, and the neutral position. This switching may occur in response to a change in polarity of a coil in the actuator. The electromagnetic actuator 232 is schematically illustrated in FIG. 2. However, in practice the actuator may have greater complexity.

To change the coil polarity, a transient current may be supplied to electromagnetic actuator 232. Arrow 234 depicts an electrical supply connection (e.g., a 12 volts (V) supply, in one use-case example) from an energy storage device 236 with the electromagnetic actuator 232. Arrow 238 depicts a control signal from a controller 224. The electromagnetic actuator 232 may be rapidly switched via a polarity change supplied to the electromagnetic actuator. However, the electromagnetic actuator remains in a target position without a hold current, if so desired. In other words, the actuator may be switched via a transient current pulse. Consequently, the electromagnetic actuator may be more efficiently and reliably operated when compared to actuators that demand a hold current to be maintained in a selected position. However, in alternate example, the electromagnetic actuator may be configured to maintain the actuator in a desired position using a hold current.

A galvanic isolator 240 may further be positioned between the lower voltage electromagnetic actuator 232 and the higher voltage multi-position switching assembly 208 to prevent electrical interference therebetween, thereby increasing the reliability of the winding reconfiguration assembly.

The dynamic winding reconfiguration device 201 is further illustrated with a sensor 242 coupled to an auxiliary contactor 243. However, other device configurations are possible.

In other examples, the sensor may be omitted from the assembly. The sensor 242 sends signals to the controller 224 which are indicative of the positions of the switches 210 in the multi-position switching assembly 208. In this way, the controller may rapidly and effectively ascertain the position of the winding reconfiguration device 201.

The controller 224 includes a processor 244 and memory 246. The memory 246 holds instructions stored therein that when executed by the processor cause the controller 224 to perform the various methods, control techniques, and the like, described herein. The processor 244 may include a microprocessor unit and/or other types of circuits. The memory 246 includes known data storage mediums such as random access memory, read only memory, keep alive memory, combinations thereof, and the like. Sensors 248 are in electronic communication with the controller 224 and provide signals thereto.

Using the winding reconfiguration assembly 200 in an externally excited electric machine (EESM) allows the machine's operating area in which stator winding reconfiguration is able to occur to be enlarged by reducing the magnetic flux in the rotor via the adaptation of the rotor excitation current. This rotor current adaptation is discussed in greater detail herein with regard to FIGS. 3-5. Overall, the electric machine achieves increased performance and efficiency across the machine's operation area without the use of permanent magnets, if desired, which may have environmental drawbacks. Further, using an EESM in conjunction with the winding reconfiguration assembly potentially allows faster and lower cost winding reconfiguration switches to be used, if desired.

Figure 3:
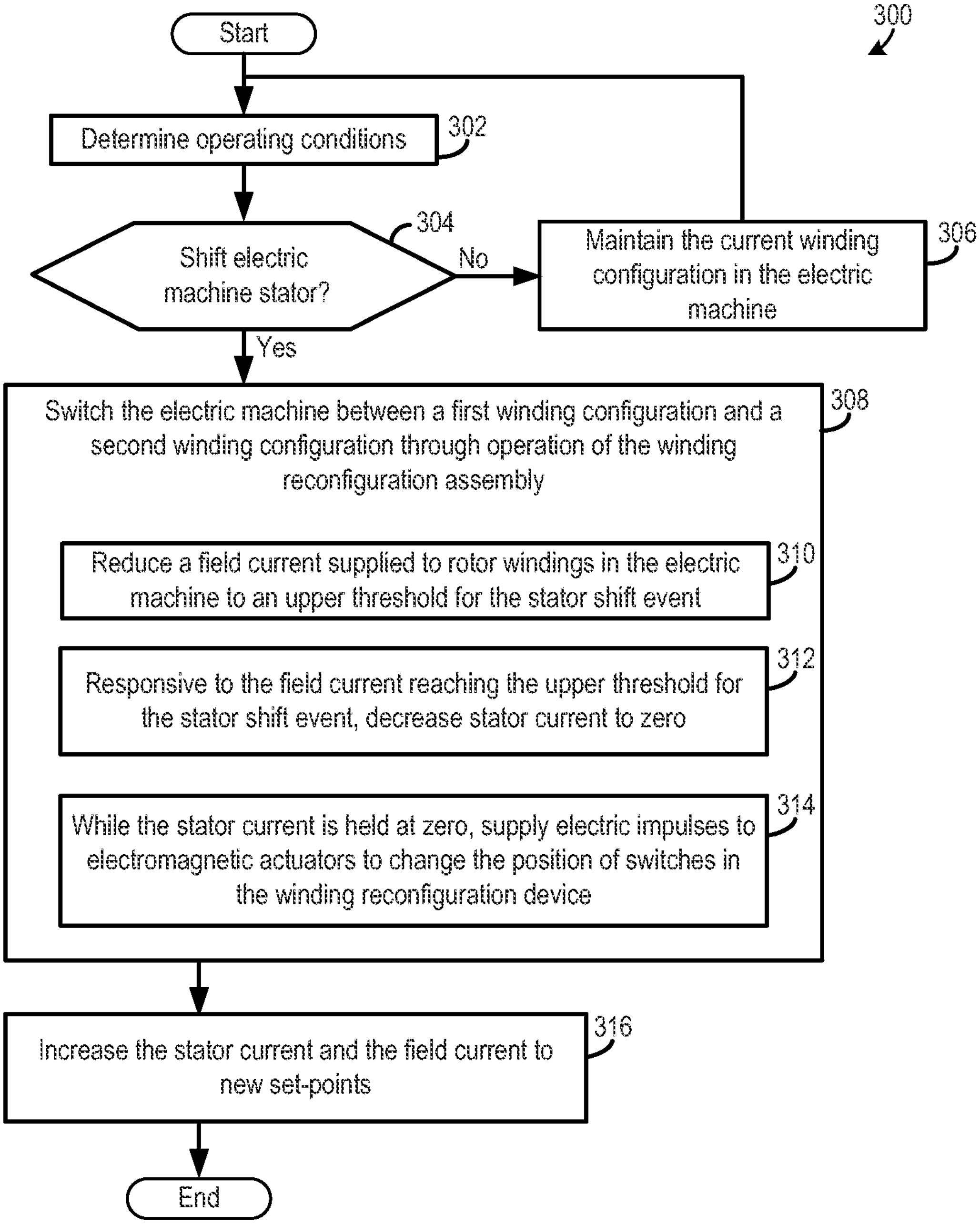
FIG. 3 is a flow chart of a method for altering a stator configuration in an externally excited electric machine using a dynamic winding reconfiguration device.

FIG. 3 shows a method 300 for operation of an externally excited electric machine system. The method 300 may be carried out by the externally excited electric machine system 102 shown in FIG. 1 and/or winding reconfiguration assembly 200 shown in FIG. 2, in one example. In other examples, the methods may be implemented via other suitable externally excited electric machine systems, winding reconfiguration assemblies, or combinations of the systems and assemblies described herein. Furthermore, the method 300 may be implemented by a controller that includes memory holding instructions for the method steps that are executable by a processor, as previously indicated.

At 302, the method includes determining operating conditions in the electric machine, winding reconfiguration assembly, and the system in which the electric machine is deployed, such as a vehicle. The operating conditions may be ascertained from sensors and/or modeling and may include stator winding current, rotor winding current, electric machine speed, electric machine load, electric machine temperature, stator winding configuration, winding reconfiguration assembly position, and the like. The operating conditions may further include requests from other controllers such as a VCU. To elaborate, the operating conditions may include a condition where the controller has received a stator-shift request.

Next at 304, the method includes judging if a stator shift, where the stator winding configuration is adjusted via the dynamic winding reconfiguration device, should be performed. This judgement may be performed based on the operating conditions and data ascertained at step 302. To elaborate, the determination at block 304 may take into account a shift request sent from another controller such as the VCU. For instance, when the MCU receives a shift request from the VCU, the MCU may determine that a stator shift should be performed. Additionally or alternatively, adjustments in electric machine speed or load may trigger initiation of the stator-shift event. Further, this stator shift judgement may take into account electric machine operating efficiency. For instance, the winding configuration may be switched when the machine's operating efficiency drops below a threshold value. Due to the use of an externally excited electric machine, the stator-shift event may take place while the electric machine is operated above a base threshold speed. The VCU may in some examples, generate a stator-shift request based on machine efficiency, machine load, machine speed, combinations thereof, and the like.

If it is determined that a stator-shift should not be performed (NO at 304), the method proceeds to 306 where the method includes maintaining the current winding configuration in the electric machine. For instance, the winding reconfiguration assembly may be maintained in its current position that corresponds to a delta configuration or a star configuration. In another example, the winding reconfiguration assembly may be maintained in its current position that corresponds to a parallel configuration or a series configuration. After 306, the method returns to 302.

Conversely, if it is determined that a stator-shift should be performed (YES at 304) the method proceeds to 308 where the method includes switching the electric machine between a first winding configuration and a second winding configuration through operation of the winding reconfiguration assembly. Switching the electric machine's stator winding configuration includes steps 310-314.

At 310, method includes reducing a field current supplied to rotor windings in the electric machine to an upper threshold for the stator-shift event. The field current threshold value is a non-zero value that is dependent on stator and rotor winding configurations and rotor speed, for example. For instance, an inverter or other suitable current source (which is coupled to the rotor windings) may be operated to reduce the current supplied to the rotor windings until the field current reaches or approaches the upper threshold.

At 312, the method includes responsive to the field current reaching the upper threshold for the stator-shift event, decreasing stator current to zero. For instance, the inverter which is electrically connected to the stator windings may be operated to reduce the stator current to zero or a value approaching zero.

At 314, the method includes, while the stator current is held at zero, supply electric impulses to electromagnetic actuators and/or other switching devices, to change the position of switches in the winding reconfiguration device. For instance, electric impulses may be sent to the electromagnetic actuators to move the switches into target positions. These electric impulses may change the polarity of the coils which induces actuator movement and switch movement. The first and second winding configurations may be star and parallel configurations or vice versa, in one example. In another examples, the first and second winding configurations may a series configuration and parallel configuration or vice versa.

At 316, the method includes increasing the stator current and the field current to new set-points. For instance, inverters may be operated to increase the currents which are supplied to stator windings and rotor windings in the electric machine. It will be understood that the stator current and the field current set-points are different than the set-points of the stator current and the field current prior to the stator-shift event. Method 300 enables the window for the stator-shift event to be expanded. To elaborate, the stator-shift event may be implemented when the electric machine is operated above a base speed due to the fact that an externally excited electric machine which reduces (e.g., avoids) back EMF when the machine is operated above the base speed. Consequently, the machine's operating efficiency and torque output is able to be increased across a wider range of machine operation due to the avoidance of speed constraints of the stator configuration switching. In this way, custom appeal is increased.

Figure 4:
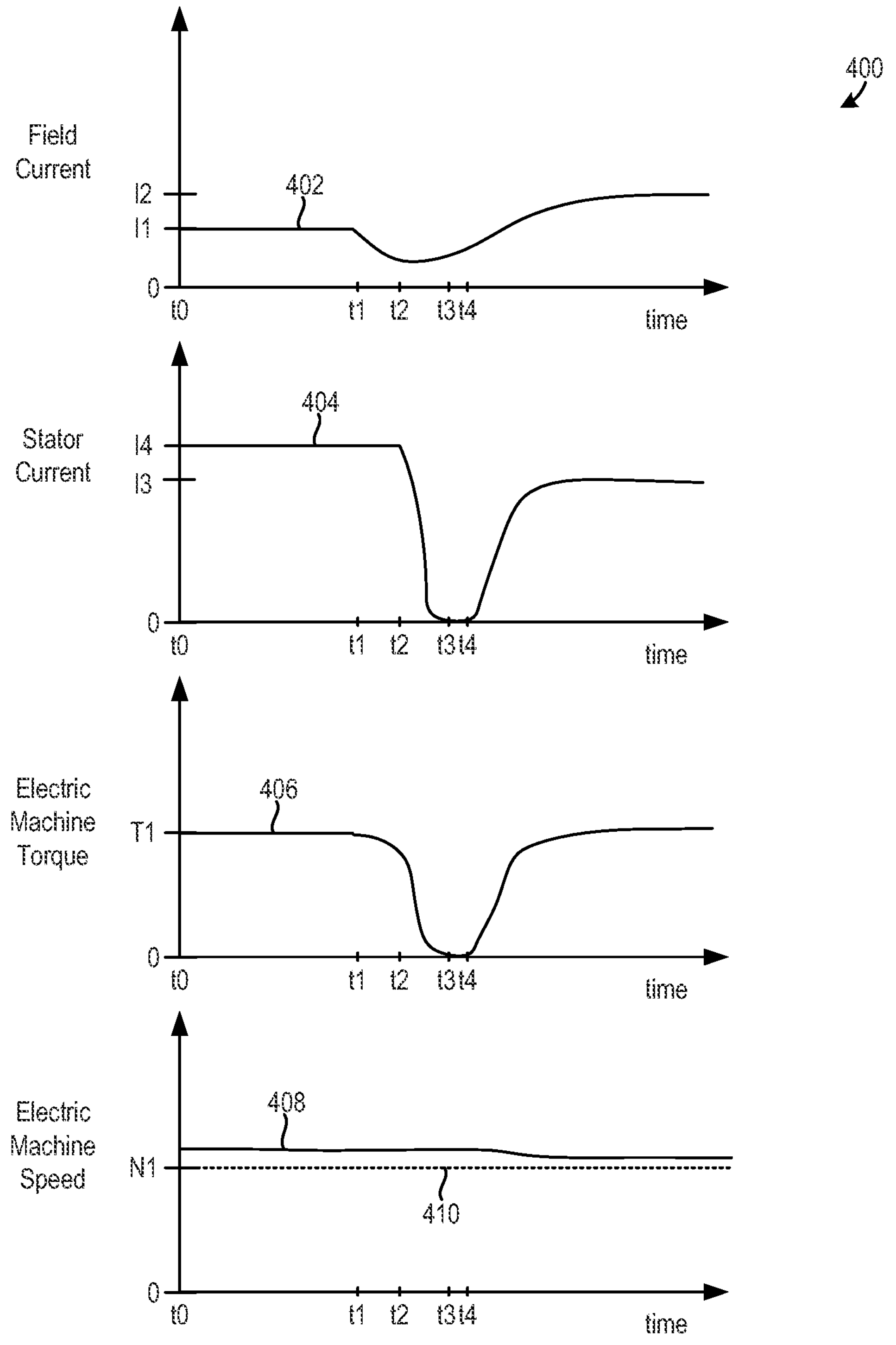
FIG. 4 is a timing diagram illustrating an exemplary stator shifting strategy in a system that includes an externally excited electric machine and a dynamic winding reconfiguration device.

FIG. 4 shows a prophetic timing diagram 400 an externally excited electric machine system operating technique. This operating technique may be implemented in any of the externally excited electric machine systems which include winding reconfiguration assemblies which are described herein or combinations of the systems and assemblies. In each graph, time is indicated on the abscissa and increases from left to right, although specific numerical values are not indicated.

The ordinate for plot 402 indicates the field current that is delivered to rotor windings. The ordinate for plot 404 indicates the stator current that is delivered to the stator windings. The ordinate for plot 406 indicates the torque which is generated by the electric machine and the ordinate for plot 408 indicates electric machine speed.

At t1, a stator-shift request is received by the controller (e.g., the MCU) and responsive to receiving the stator shift request. For instance, a stator shift request may be sent from the VCU to the MCU. The stator shift request may be generated based on the machine's operating efficiency, machine speed, machine load, combinations thereof, and the like.

In response to receiving the stator shift request at t1, the field current is reduced until it reaches an upper threshold value at t2. The upper threshold value may be a dynamic value which is a function of the rotor speed and the de-link voltage. An example of the upper threshold field current is shown in FIG. 5 and discussed in greater detail herein.

Once the field current reaches the upper threshold value at t2, the stator current is decreased until it reaches zero or a value approaching zero at t3. The stator current is held at zero from t3 to t4 while the stator winding reconfiguration device is operated to alter configuration of the stator winding phases. For instance, the stator may be switched from a star configuration to a delta configuration or vice versa. In other examples, the stator may be switched from a series configuration to a parallel configuration or vice versa. Further, during the shift event from t2-t4 the electric machine speed remains substantially constant, in the illustrated example. It will be appreciated that when the powertrain is configured for two-wheel drive from a small drop in motor speed caused by motor drag which may be almost negligible in an EESM, may occur, in some cases.

At t4, once the switches in the stator reconfiguration device have been actuated to transition the stator into the desired configuration, both the field current and the stator current are ramped up to new set-points. It will be appreciated that these new set-points are different from the set-points for the field current and the stator current prior to the shift event due to the reconfiguration of the stator windings. However, the torque set-point of the electric machine is equivalent before and after the shift event, to reduce (e.g., avoid) noise, vibration, and harshness (NVH) corresponding to the shift event. Further, as shown in FIG. 4, the machine speed is maintained above a base speed threshold 410 during stator reconfiguration.

Figure 5:
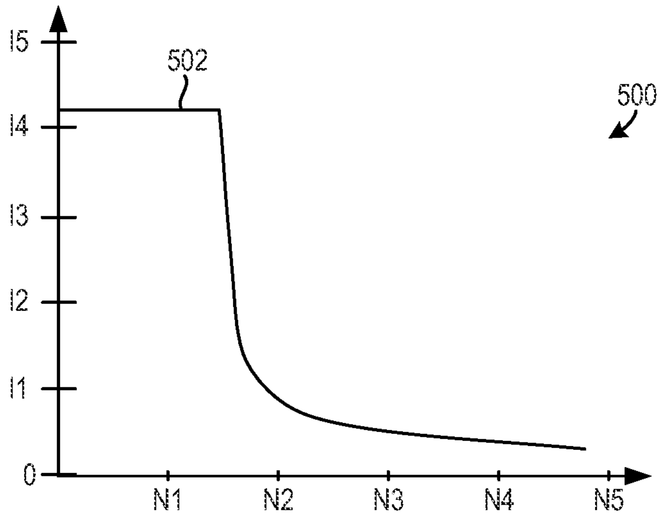
FIG. 5 is a graph of an upper threshold field current vs electric machine speed which may be used in a stator shifting strategy.

FIG. 5 show a prophetic field current vs speed graph 500 corresponding to an exemplary upper threshold 502 for the field current during a stator-shift event. This upper threshold is an example of the upper threshold for the field current discussed with regard to step 310 in method 300. In FIG. 5, although specific numerical values are not provided on the ordinates and the abscissas, the current and speed increase in the direction of the arrows.

The field current may be reduced to its upper limit in anticipation of a shift event. The upper threshold 502 is a function of the rotor speed and the de-link voltage. Unwanted regeneration results when the line-to-line back EMF is higher than the de-link voltage. In the latter case, the inverter will act as diode rectifier.

The technical effect of the externally excited electric machine operating methods described herein is reduce regeneration when the field current is brought to zero during a shift event which allows the configuration of the stator to be shifted over a wider range of machine speeds, thereby enable the machine's operating efficiency and performance to be increased.

FIG. 1 shows example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements co-axial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such.

The invention will be further described in the following paragraphs. In one aspect, a method for operation of an externally excited electric machine system is provided that comprises operating the externally excited electric machine above a threshold speed in a first stator winding configuration of a stator; and switching the stator from the first winding configuration to a second winding configuration while the externally excited electric machine is maintained above the threshold speed; wherein the externally excited electric machine includes a plurality of rotor windings configured to be externally excited. In one example, switching the stator from the first winding configuration to the second winding configuration may be initiated in response to a stator shift request. In another example, switching the stator from the first winding configuration to the second winding configuration may include reducing a field current which is delivered to the rotor windings to an upper threshold value for the switching event. In yet another example, switching the stator from the first winding configuration to the second winding configuration may include initiating a reduction in stator current in response to the field current reaching the upper threshold. In another example, the stator current may be reduced to zero or a value approaching zero. In yet another example, the method may further comprise increasing the stator current and the field current to new set-points after the stator is switched from the first winding configuration to the second winding configuration. In another example, a torque set-point of the externally excited electric machine before the stator is switched is equivalent to a torque set-point of the externally excited electric machine. In another example, the first winding configuration may be a star configuration and the second winding configuration is a delta configuration or vice versa. In yet another example, the stator may be configured as a thee, five, six, or nine phase stator.

In another aspect, an externally excited electric machine system is provided that comprises a stator; a dynamic winding reconfiguration device configured to switch a winding configuration of the stator; a rotor including a plurality of rotor windings configured for external excitation; and a controller including instructions that when executed by the controller, in response to receiving a stator shift request and when the externally excited electric machine is operated over a threshold speed, cause the controller to: switch the stator between a first winding configuration and a second winding configuration. In another example, switching the dynamically reconfigurable stator between the first winding configuration and the second winding configuration may include decreasing a field current delivered to the plurality of rotor windings to an upper threshold for shifting in response to receiving the stator shift request; and in response to the field current reaching or approaching the upper threshold, decreasing a stator current delivered to the stator to zero. In another example, switching the stator between the first winding configuration and the second winding configuration may include operating switches in the dynamic winding reconfiguration device to alter the configuration of the stator while the stator current is held at zero. In another example, the controller may include instructions that when executed by the controller, in response completion of switching the stator between the first winding configuration and the second winding configuration, cause the controller to: increase the stator current and the field current to new set-points after the stator is switched from the first winding configuration to the second winding configuration. In another example, one of the first and second winding configurations may be a star configuration. In another example, one of the first and second winding configurations may be a delta configuration. In yet another example, the externally excited electric machine may be an electric motor in an electric powertrain.

In yet another aspect, a method for operation of an externally excited synchronous electric machine system is provided that comprises during a stator winding reconfiguration event when the externally excited synchronous electric machine is operating above a threshold speed, reducing a stator current supplied to a dynamically reconfigurable stator to zero and operating switches in the dynamically reconfigurable stator to alter the configuration of the dynamically reconfigurable stator while the stator current is maintained at zero. In one example, the method may further comprise, during the stator winding reconfiguration event, prior to reducing the stator current, reducing a field current supplied to a plurality of rotor windings to an upper threshold value for the stator winding reconfiguration event. In yet another example, the method may further comprise, subsequent to the stator winding reconfiguration event, increasing the stator current and the field current to new set-points after the stator is switched from the first winding configuration to the second winding configuration, wherein a torque set-point of the externally excited electric machine before the stator is switched is equivalent to a torque set-point of the externally excited electric machine. In another example, the dynamically reconfigurable stator may be configured to operate in at least one of a delta configuration and a star configuration.

In another representation, an externally excited synchronous motor (EESM) assembly is provided that comprises a stator configuration adjustment device that is configured to change a configuration of stator windings while a stator current is maintained at zero and the EESM is operating above a base speed.

While various embodiments have been described above, it should be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to a variety of systems that include electric drives with different types of propulsion sources including internal combustion engines, in a hybrid vehicle example. The subject matter of the present disclosure includes all novel and non-obvious combinations and sub-combinations of the various systems and configurations, and other features, functions, and/or properties disclosed herein.

Note that the example control and estimation routines included herein can be used with various electric drive and/or system configurations. The control methods and routines disclosed herein may be stored as executable instructions in non-transitory memory and may be carried out by the control system including the controller in combination with the various sensors, actuators, and other electric drive and/or system hardware in combination with the electronic controller. As such, the described actions, operations, and/or functions may graphically represent code to be programmed into non-transitory memory of the computer readable storage medium in the electric drive and/or the system. The various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for operation of an externally excited electric machine system, comprising:
operating an externally excited electric machine above a threshold speed in a first stator winding configuration of a stator; and
switching the stator from a first winding configuration to a second winding configuration while the externally excited electric machine is maintained above the threshold speed;
wherein the externally excited electric machine includes a plurality of rotor windings configured to be externally excited, and
wherein switching the stator from the first winding configuration to the second winding configuration includes reducing a field current which is delivered to the rotor windings to an upper threshold value for the switching event.

2. The method of claim 1, wherein switching the stator from the first winding configuration to the second winding configuration is initiated in response to a stator shift request.

3. The method of claim 1, wherein switching the stator from the first winding configuration to the second winding configuration includes initiating a reduction in stator current in response to the field current reaching the upper threshold.

4. The method of claim 3, wherein the stator current is reduced to zero or a value approaching zero during the stator switching.

5. The method of claim 4, further comprising increasing the stator current and the field current to new set-points after the stator is switched from the first winding configuration to the second winding configuration.

6. The method of claim 1, wherein a torque set-point of the externally excited electric machine before the stator is switched is equivalent to a torque set-point of the externally excited electric machine.

7. The method of claim 1, wherein the stator is configured as a thee, five, six, or nine phase stator.

8. The method of claim 1, wherein the first winding configuration is a star configuration and the second winding configuration is a delta configuration or vice versa.

9. An externally excited electric machine system, comprising:
a stator;
a dynamic winding reconfiguration device configured to switch a winding configuration of the stator;
a rotor including a plurality of rotor windings configured for external excitation; and
a controller including instructions that when executed by the controller, in response to receiving a stator shift request and when an externally excited electric machine is operated over a threshold speed, cause the controller to:
switch the stator between a first winding configuration and a second winding configuration, including:
decreasing a field current delivered to the plurality of rotor windings to an upper threshold for shifting in response to receiving the stator shift request; and
in response to the field current reaching or approaching the upper threshold, decreasing a stator current delivered to the stator to zero.

10. The externally excited electric machine system of claim 9, wherein switching the stator between the first winding configuration and the second winding configuration includes:
operating switches in the dynamic winding reconfiguration device to alter the configuration of the stator while the stator current is held at zero during the stator switching.

11. The externally excited electric machine system of claim 10, wherein the controller includes instructions that when executed by the controller, in response completion of switching the stator between the first winding configuration and the second winding configuration, cause the controller to:
increase the stator current and the field current to new set-points after the stator is switched from the first winding configuration to the second winding configuration.

12. The externally excited electric machine system of claim 9, wherein one of the first and second winding configurations is a star configuration.

13. The externally excited electric machine system of claim 12, wherein one of the first and second winding configurations is a delta configuration.

14. The externally excited electric machine system of claim 9, wherein the externally excited electric machine is a traction motor in an electric powertrain.

15. A method for operation of an externally excited synchronous electric machine system, comprising:
during a stator winding reconfiguration event when an externally excited synchronous electric machine is operating above a threshold speed, reducing a stator current supplied to a dynamically reconfigurable stator to zero and operating switches in the dynamically reconfigurable stator to alter the configuration of the dynamically reconfigurable stator while the stator current is maintained at zero; and
during the stator winding reconfiguration event, prior to reducing the stator current, reducing a field current supplied to a plurality of rotor windings to an upper threshold value for the stator winding reconfiguration event.

16. The method of claim 15, further comprising, subsequent to the stator winding reconfiguration event, increasing the stator current and the field current to new set-points after the stator is switched from the first winding configuration to the second winding configuration, wherein a torque set-point of the externally excited electric machine before the stator is switched is equivalent to a torque set-point of the externally excited electric machine.

17. The method of claim 15, wherein the dynamically reconfigurable stator is configured to operate in at least one of a delta configuration and a star configuration.

* * * * *